Oct. 18, 1955 F. W. SCHMIDT, JR 2,721,260

TELEVISION INPUT CIRCUIT

Filed Oct. 9, 1950

INVENTOR.
FRED W. SCHMIDT, JR.

BY Daly & Daly
ATTORNEYS 2,721,260
Patented Oct. 18, 1955

2,721,260

TELEVISION INPUT CIRCUIT

Fred W. Schmidt, Jr., Cedar Grove, N. J., assignor to Allen B. Du Mont Laboratories, Inc., Clifton, N. J., a corporation of Delaware Application October 9, 1950, Serial No. 189,074
10 Claims. (Cl. 250—20)

Figures 1, 2:
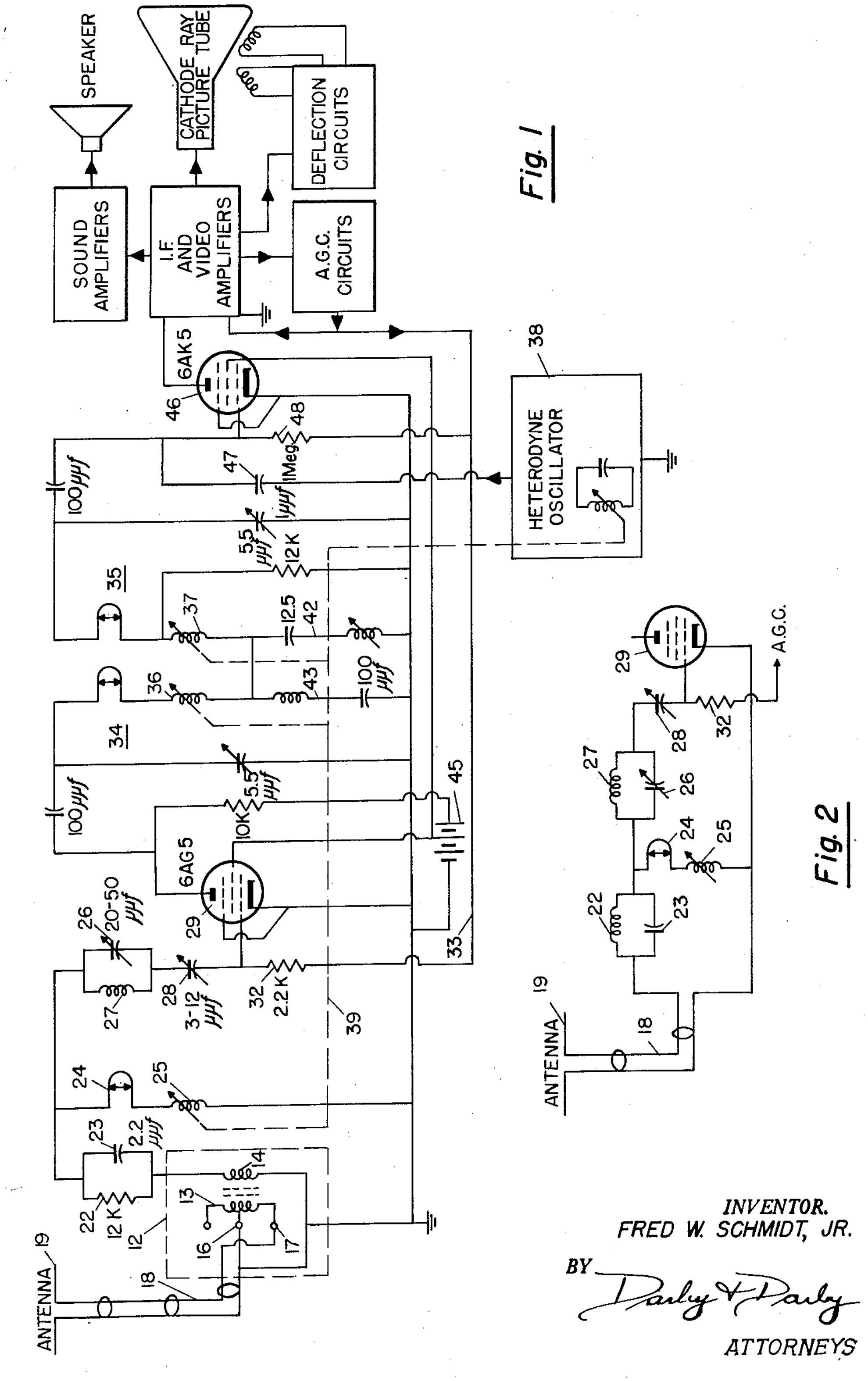

This invention relates to receivers of electromagnetic energy and the like such as television receivers, and to circuits therein for coupling an antenna to an input amplifier stage.

In the reception of television signals, energy is received at an antenna which is often located at a distance from the receiver itself, and a transmission line connects the antenna and the receiver. In order to avoid reflections within the transmission line, which would cause multiple images or "ghosts" in the received picture, the transmission line must be terminated or matched in its characteristic impedance at the receiver.

It is accordingly an object of this invention to provide an input circuit which matches a transmission line to a television receiver.

It is another object to provide an input circuit which matches an unbalanced transmission line such as a coaxial cable to an unbalanced input stage such as a single ended amplifier tube.

It is a further object to provide a selective amplifying circuit giving tunable selectivity between an input terminal and a first stage of amplification and which tracks with other selective stages in cascade therewith.

It is another object to provide for a maximum and efficient transfer of energy from a transmission line to the input terminals of an amplifier.

It is a further object to provide a selective input circuit in which the tunable range is large.

In accordance with my invention a variable tuning inductance is coupled to an antenna through a parallel network of resistance and capacitance, and to the input electrodes of an amplifier tube through a parallel network of capacitance and inductance, this latter network being resonant at a fixed frequency below the tuning range of the tuning inductance.

In the drawings:

Figure 1 is a diagram partly in schematic and partly in block form of a television receiver incorporating a preferred embodiment of the invention; and Figure 2 is a second embodiment thereof.

The receiver of Figure 1 contains an antenna coupling transformer 12, preferably the type described in the copending application Serial No. 189,075 filed October 9, 1950 assigned to applicant's assignee, having a primary winding 13 and a secondary winding 14. The primary winding 13 has connecting terminals 16, 17 connected to a coaxial or unbalanced transmission line 18. The other end of the transmission line 18 is connected to a television receiving antenna 19 which may be of any well known type in which energy in the regions of television signals transmitted according to present standards in the bands of 54–88 megacycles and 174–216 megacycles, is intercepted and transferred efficiently and with proper matching of impedances to the transmission line 18.

The secondary winding 14 is connected to the parallel combination of a resistor 22 and a capacitor 23, these two elements having values such that their impedances are equal at approximately 5 megacycles. Since this frequency is well below the lower frequency limit of 54 megacycles of the television band to be received, the resistance of the resistor 22 is accordingly greater than the reactance of the capacitor 23 in the band to be received. The reactance of the capacitor 23 moreover is greater than the output resistance, generally 300 ohms, of the secondary of the transformer 12. A trimming inductor 24, preferably of the type described in my copending application 51,727, filed September 29, 1948, now abandoned, and assigned to the same assignee, and a variable tuning inductor 25, continuously tunable with essentially fixed circuit capacitance through the television signal transmission range or band, are connected in series with the secondary winding 14 and the parallel combination of elements 22, 23.

The junction of the trimming inductor 24 and the parallel combination 22, 23 is connected to a second parallel combination of a variable padding capacitor 26 and an inductor 27 which are mutually resonant at a frequency of about 40 megacycles. The second parallel combination 26, 27 is connected by means of a trimming capacitor 28 to the control grid of an amplifier tube 29, which is preferably a pentode amplifier having the cathode and control grid connected as input electrodes and the cathode and anode as output electrodes. A damping resistor 32 connects the grid of the amplifier tube 29 to a negatively biased automatic gain control bias 33.

The anode circuit of the amplifier tube 29 comprises a doubly tuned filter tunable between 54 and 216 megacycles preferably of the type described in my copending application 51,728 filed September 29, 1948, now Patent No. 2,661,459, issued December 1, 1953, and assigned to the same assignee, containing primary and secondary tuned circuits 34 and 35. These primary and secondary circuits are tuned by means of variable inductors 36 and 37 which are ganged on a common turning shaft to track or align with the variable inductor 25 and with an inductively tuned heterodyne oscillator 38 as indicated by the broken line 39 connecting the several elements. The primary and secondary circuits 34, 35 are preferably coupled by means of a series resonant circuit 42, of the type described in my copending application No. 168,832, filed June 17, 1950, now Patent No. 2,709,788, issued May 31, 1955, and resonant above the upper limit of the tunable band at approximately 250 megacycles in parallel with a second circuit 43 series resonant below the band at approximately 25 megacycles. The two series circuits are parallel resonant below the lower limit of the band at about 40 megacycles. This circuit, parallel resonant below the band, has the effect of decreasing the effective tuning capacitance of the primary and secondary circuits at the lower end of their tuning range. The anode of the tube 29 is connected through a resistor 44 to a positive potential source 45. The secondary circuit 35 is connected to the control grid of a heterodyne mixer tube 46, which is coupled to the oscillator 38 through a small coupling capacitor 47, and connected through a resistor 48 to the automatic gain control bus 33.

In adjusting the receiver for alignment, the input circuit is made to track at the high frequency end by means of the trimming inductor 24, at the lower frequency end by means of the capacitor 28, and in the middle by means of the capacitor 26.

In the operation of the circuit, energy is fed from the transmission line 18 which has an output characteristic impedance of about 75 ohms to the transformer 12. Thus connected the transformer 12 has an essentially resistive output impedance in the range, 54–216 megacycles, of frequencies to be received. This energy is coupled through the capacitor 23 to a resonant circuit comprising the tuning inductor 25 and other circuit and distributed capacitances. The resonant circuit in turn feeds energy to the grid of the tube 29, whence it is amplified in the usual way.

The parallel resonant coupling circuit 42, 43 in the primary and secondary circuits 34, 35 has the effect at the low frequency end of the range, of apparently decreasing the capacitances with which the inductors 36 and 37 resonate, causing the relation of the tuning of these elements to deviate from the frequency relationship they would have in the absence of this parallel resonance. In the input circuit the parallel resonant network 26, 27 acts to insure the tracking of the tuned input with the circuits 34, 35 by decreasing the effective capacitance with which the tuning inductor 25 resonates.

At the frequencies in which this input circuit is operated the pentode amplifier tube 29 has an input resistance that is inversely proportional to the square of the frequency. This conductance is parallelled by the input capacitance of the tube in which the reactance is inversely proportional to first power of frequency and is less in impedance magnitude than the input resistance. As the input circuit is tuned through its range by means of the variable inductor 25, the Q of the circuit with which the inductor 25 resonates is inversely proportional to frequency in so far as it is affected by the input conductance of the tube 29, neglecting other losses. This condition would be desirable for matching a transmission line of constant output impedance over the band since it provides a resistance load of approximately 300 ohms to the output terminals of the transformer 12, and this load would be constant over the tunable band of frequencies in so far as the inverse square relationship holds. Departure from this idealized condition is realized in practice due to increased losses in the transformer 12 at higher frequencies, which lowers the output impedance. This effect is balanced in practice by the use of a damping resistor 32 in parallel with the tube 29. At low frequencies the network 26, 27 functions to decouple the tube 29 from the resonant circuit of the inductor 25. In the absence of the network 22, 23 this would tend to make the resistance load connected to the secondary of the transformer too small, and would cause mismatch of the transformer 12 reflected through as mismatch of the transmission line 18. The network 22, 23 is effective to prevent this undesired mismatch by adding a resistive component at low frequencies effectively in series with the other circuits. The additional losses to the circuit at low frequencies by the resistances 22 and 32 are also effective in preventing the pass band of this input circuit from becoming too narrow at the lowest receivable frequencies.

In the second embodiment shown in Figure 2, the transmission line 18 is connected directly to the network 22, 23 without being coupled through an input transformer.

Although the invention is described as applied to present television broadcast frequencies, it is apparent that the principles are applicable to other frequency bands.

While specific embodiments have been shown and described, the invention is defined in the following claims.

What is claimed is:

1. A tunable selective amplifier comprising an amplifier tube having respective pairs of input electrodes and output electrodes, a doubly tuned filter tunable over a frequency range, said filter having a selective primary circuit connected between said output electrodes, said primary circuit containing a first variable inductor as a tuning element therein, a selective secondary circuit containing a second variable inductor as a tuning element therein, and a coupling network common to said primary and secondary circuits and parallel resonant at a frequency below said range at approximately the lower limit thereof, and an input circuit connected between said input electrodes and comprising a third variable inductor tunable over said range with substantially fixed capacitance and ganged to tune with said first and said second inductors, and a network comprising an inductive member and a capacitive member connected in parallel and having values to be parallel resonant at a frequency below said range, said network being connected in series between said third variable inductor and one of said input electrodes.

2. A television input circuit comprising the series combination of a variable tuning inductor tunable over a range of frequencies, an antenna terminal, a parallel network of resistance and capacitance connected between said terminal and one end of said variable inductor; an amplifier tube having an input electrode, and a parallel network connected in series between said electrode and said end of said variable inductor, said last named parallel network comprising an inductive member and a capacitive member parallel resonant at a frequency below said range of frequencies, and said first named parallel network comprising a capacitor and a resistor having equal impedance at a frequency below the frequency of resonance of said last named parallel network.

3. A selective terminating circuit for a transmission line coupled to signal terminals having over a frequency range a characteristic impedance, said circuit comprising a thermionic tube having a pair of input electrodes characterized by input resistance and input capacitance, said input resistance being higher in impedance over said range of frequencies than said input capacitance, a capacitive element having a reactance high with respect to said characteristic impedance over said range of frequencies, and a variable tuning inductive element connected in series with said capacitive element between said signal terminals, said inductive element being connected in parallel with said input electrodes.

4. A television input circuit for connection to a transmission line comprising a step up transformer connected to terminate said line and having a secondary winding having a characteristic impedance over a frequency range, a thermionic tube having a pair of input electrodes characterized by input resistance and input capacitance, said input resistance being higher in impedance over said range than said input capacitance, a capacitive element having a reactance high with respect to said characteristic impedance over said range, and a variable tuning inductive element connected in series with said capacitive element across the secondary of said transformer, said inductive element being connected in parallel with said input electrodes.

5. A selective terminating circuit for a transmission line coupled to signal terminals having over a frequency range a characteristic impedance, said circuit comprising a thermionic tube having a pair of input electrodes characterized by input resistance and input capacitance, said input resistance being higher in impedance over said range of frequencies than said input capacitance, a capacitive element having a reactance high with respect to said characteristic impedance over said range of frequencies, said capacitive element and said input electrodes of said thermionic tube being connected in series between said signal terminals, and a variable tuning inductor connected in parallel with said input electrodes, said tuning inductor being resonant over said tuning range with said capacitive element and said input capacitance.

6. A selective terminating circuit for a transmission line coupled to signal terminals having over a frequency range a characteristic impedance, said circuit comprising a thermionic tube having a pair of input electrodes characterized by input resistance and input capacitance, said input resistance being higher in impedance over said range of frequencies than said input capacitance, a capacitive element having a reactance high with respect to said impedance over said range of frequencies, a second capacitive element having a reactance high with respect to said impedance over said range of frequencies, said capacitive elements being connected to one another and in series with said input electrodes between said signal terminals and a variable tuning inductor connected between the junction of said capacitive elements and one of said signal terminals, in parallel with said input electrodes, said tuning inductor being resonant over said tuning range with said capacitive elements.

7. A selective terminating circuit for a transmission line comprising two conductors and having over a frequency range a characteristic impedance, said circuit comprising a thermionic tube having input electrodes characterized by input resistance and input capacitance, said input resistance being higher in impedance over said range of frequencies than said input capacitance, a first parallel network consisting of a capacitive element having a reactance high with respect to said impedance over said range of frequencies and a resistive element having a resistive value high with respect to said reactance of said capacitive element over said range of frequencies, said first parallel network being connected to one of said conductors, a second parallel network comprising inductance and capacitance parallel resonant at a frequency below said range of frequencies, said second parallel network being connected between said first parallel network and an input electrode of said tube, and a variable tuning inductor connected between the junction of said first and said second parallel networks and the remaining one of said conductors.

8. The amplifier in accordance with claim 1, in which said amplifier tube is a pentode type, said input electrodes comprise a control grid and a cathode of said tube, a resistor is connected to said control grid, a source of negative voltage is connected to an end of said resistor farthest removed from said control grid, and a trimmer capacitor is connected in series between said third variable inductor and one of said input electrodes.

9. The amplifier in accordance with claim 1, including an antenna and a second network comprising a parallel-connected resistor and capacitor connected in series between said antenna and said third variable inductor.

10. The amplifier in accordance with claim 1, in which a second network comprising a resistance and capacitance connected in parallel, is connected to an end of said third variable inductor, and a source of signals is connected to said third variable inductor through said second network.

References Cited in the file of this patent

UNITED STATES PATENTS

| | | |
|---|---|---|
| 1,967,570 | Dalpayrat | July 24, 1934 |
| 2,268,672 | Plebanski | Jan. 6, 1942 |
| 2,305,743 | Six | Dec. 22, 1942 |
| 2,312,211 | DeCola | Feb. 23, 1943 |
| 2,321,291 | Grundmann | June 8, 1943 |
| 2,342,638 | Bode | Feb. 29, 1944 |
| 2,602,864 | Bagley | Oct. 28, 1952 |
| 2,615,983 | Bussard | Oct. 28, 1952 |
| 2,662,216 | Klinkhamer | Dec. 8, 1953 |